(12) United States Patent
Roessler et al.

(10) Patent No.: US 12,080,541 B2
(45) Date of Patent: *Sep. 3, 2024

(54) DEVICE HAVING ONE OR MORE FIRST LEVEL ION TRAPS

(71) Applicant: Infineon Technologies Austria AG, Villach (AT)

(72) Inventors: Clemens Roessler, Villach (AT); Silke Katharina Auchter, Villach (AT); Johanna Elisabeth Roessler, Villach (AT); Gerald Stocker, Goritschach (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,480

(22) Filed: Jun. 19, 2023

(65) Prior Publication Data

US 2023/0343576 A1    Oct. 26, 2023

Related U.S. Application Data

(63) Continuation of application No. 17/488,372, filed on Sep. 29, 2021, now Pat. No. 11,721,537.

(30) Foreign Application Priority Data

Sep. 30, 2020    (EP) ..................................... 20199366

(51) Int. Cl.
     *H01J 49/42*          (2006.01)
     *H01J 49/00*          (2006.01)

(52) U.S. Cl.
     CPC ........ *H01J 49/424* (2013.01); *H01J 49/0018* (2013.01)

(58) Field of Classification Search
     CPC ........................... H01J 49/424; H01J 49/0018
(Continued)

(56) References Cited

U.S. PATENT DOCUMENTS 6,870,158 B1    3/2005    Blain
7,154,088 B1    12/2006    Blain et al.
(Continued)

FOREIGN PATENT DOCUMENTS

GB            2493276 A     1/2013
WO         2007052273 A2     5/2007

OTHER PUBLICATIONS

"Modular Scalable Quantum Computing with Atomic Ions", https://www.youtube.com/watch?v=eFNByndz5JA, Feb. 15, 2015, 1-5.
(Continued)

*Primary Examiner* — Nicole M Ippolito
(74) *Attorney, Agent, or Firm* — Murphy, Bilak & Homiller, PLLC

(57) ABSTRACT

A device for trapping ions includes: a first substrate having an upper multi-layer electrode structure implemented at a top side of the first substrate; a second substrate disposed over the first substrate and having a lower multi-layer electrode structure implemented at a bottom side of the second substrate; and one or more first level ion traps configured to trap ions in a space between the first substrate and the second substrate. The one or more first level ion traps includes the upper multi-layer electrode structure of the first substrate and the lower multi-layer electrode structure of the second substrate. A method of controlling trapped ions in a device is also described.

19 Claims, 4 Drawing Sheets

(58) Field of Classification Search
USPC .................................. 250/281, 282, 283
See application file for complete search history.

(56) References Cited

U.S. PATENT DOCUMENTS 11,721,537 B2 * 8/2023 Roessler ............ H01J 49/4225
250/281
2022/0102301 A1 3/2022 Roessler et al.

OTHER PUBLICATIONS

"Quantum Computer Blueprint with Trapped Ions", https://www.youtube.com/watch?v=LZdJBIpryMw, Feb. 2, 2017, 1-6.

Blakestad, R. B., et al., "High-Fidelity Transport of Trapped-Ion Qubits through an X-Junction Trap Array", The American Physical Society; Physical Review Letters; PRL 102, 153002 (2009), Apr. 17, 2009, 153002-1 to 153002-4.

Boldin, Ivan A., et al., "Measuring Anomalous Heating in a Planar Ion Trap with Variable Ion-Surface Separation", American Physical Society; Physical Review Letters 120, 023201 (2018), Jan. 12, 2018, 1-7.

Cho, Dong-Il "Dan", et al., "A review of silicon microfabricated ion traps for quantum information processing", Micro and Nano Systems Letters, 3:2, 2015, 1-12.

Kielpinski, D., et al., "Architecture for a large-scale ion-trap quantum computer", Nature, vol. 417; www.nature.com/nature, Jun. 13, 2002, 709-711.

Kim, Tony Hyun, et al., "Surface-electrode point Paul trap", American Physical Society; Physical Review A 82, 043412 (2010), 2010, 043412-1 to 043412-9.

Northup, T. E., et al., "Quantum information transfer using photons", Nature Photon 8, 356-363 (2014). https://doi.org/10.1038/nphoton.2014.53, Aug. 2, 2017, 1-25.

Pedregosa-Gutierrez, Jofre, et al., "Ion transport in macroscopic RF linear traps", arXiv:1403.2568 [physics. atom-ph]; https://doi.org/10.48550/arXiv.1403.2568, Mar. 11, 2014, 1-21.

Rowe, M. A., et al., "Transport of quantum states and separation of ions in a dual RF ion trap", Quantum Information and Computation, vol. 1, No. 0, 2001, 1-15.

Shu, G., et al., "Heating rates and ion motion control in a Y-junction surface-electrode trap", Phys. Rev. A 89, 062308; https://doi.org/10.1103/PhysRevA.89.062308, Mar. 19, 2014, 1-14.

Warring, U., et al., "Individual-Ion Addressing with Microwave Field Gradients", Physical Review Letters 110, Mar. 19, 2013, 1-5.

Zhang, J., et al., "Observation of a Many-Body Dynamical Phase Transition with a 53-Qubit Quantum Simulator", Nature 551, https://doi.org/10.1038/nature24654, Aug. 7, 2017, 1-8.

* cited by examiner

DEVICE HAVING ONE OR MORE FIRST LEVEL ION TRAPS

TECHNICAL FIELD

This disclosure relates generally to the field of trapped ions, and in particular to devices and methods for controlling trapped ions for quantum computing.

BACKGROUND

Trapped ions are one of the most promising candidates for use as qubits (quantum bits) in quantum computers since they can be trapped with long lifetimes in a scalable array by virtue of electromagnetic fields. Presently, the most advanced ion traps can control about 50 qubits individually and can maintain up to 16 qubits in a fully entangled state. Future quantum computers will need to increase the number of controllable qubits to more than 100 or even 1000 to outperform classical supercomputers. Further, the number of ions used for each qubit will in future be raised to about 6 to 100 ions in order to allow for more efficient error-correction during quantum computing.

With increasing the number of ions, the area requirement for devices for controlling trapped ions such as, e.g., quantum computing devices increases. Assuming a mean distance between neighboring ions of 10 to 100 µm and a number of 10000 ions, the total required area may be as large as 100 cm to 1 $m^2$.

Another problem which arises when scaling-up the number of ions is the increased occurrence of decoherence caused by optical crosstalk. That is, manipulating and reading-out electronic states of a specific ion may produce scattered light which can undesirably interact with other ions.

Hence, increasing the number of simultaneously trapped ions while maintaining the ability to control and measure them individually is one of the main challenges for progressing to practical quantum computing.

Concepts for addressing these challenges are lateral shuttling of ions and exploiting remote entanglement between spatially separated ions. However, there remains the need to scale-up existing systems of trapped ions and to develop means to control a larger number of ion qubits.

SUMMARY

According to an aspect of the disclosure, a device for controlling trapped ions includes a first substrate. A second substrate is disposed over the first substrate. One or a plurality of first level ion traps is configured to trap ions in a space between the first substrate and the second substrate. One or a plurality of second level ion traps is configured to trap ions in a space above the second substrate. An opening in the second substrate is provided through which ions can be transferred between a first level ion trap and a second level ion trap.

According to another aspect of the disclosure, a method of controlling trapped ions in a device having a first substrate and a second substrate disposed over the first substrate is disclosed. One or a plurality of first level ion traps is configured to trap ions in a space between the first substrate and the second substrate. One or a plurality of second level ion traps is configured to trap ions in a space above the second substrate. An opening in the second substrate is provided through which ions can be transferred between a first level ion trap and a second level ion trap. The method comprises transferring ions between a first level ion trap and a second level ion trap through the opening.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other and/or can be selectively omitted if not described to be necessarily required. Embodiments are depicted in the drawings and are exemplarily detailed in the description which follows.

DETAILED DESCRIPTION

The words "over" or "beneath" with regard to a part, element or material layer formed or located or disposed or arranged or placed "over" or "beneath" a surface may be used herein to mean that the part, element or material layer be located (e.g. placed, formed, arranged, disposed, placed, etc.) "directly on" or "directly under", e.g. in direct contact with, the implied surface. The word "over" or "beneath" used with regard to a part, element or material layer formed or located or disposed or arranged or placed "over" or "beneath" a surface may, however, either be used herein to mean that the part, element or material layer be located (e.g. placed, formed, arranged, deposited, etc.) "indirectly on" or "indirectly under" the implied surface, with one or more additional parts, elements or layers being arranged between the implied surface and the part, element or material layer.

Figure 1A:
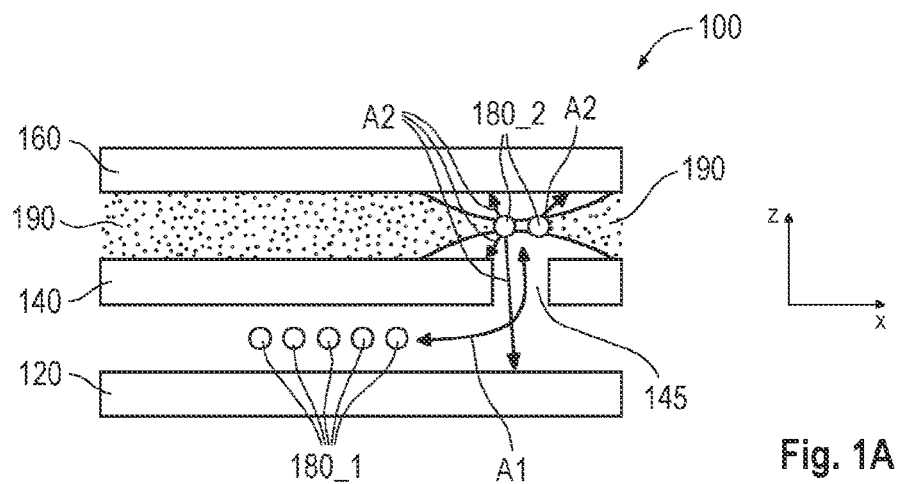
FIG. 1A is a schematic cross-sectional view of an exemplary device for controlling trapped ions comprising three or more substrates placed one above the other.

Referring to FIG. 1A, a device 100 for controlling trapped ions may include a first substrate 120, a second substrate 140 and a third substrate 160. The second substrate 140 is disposed over the first substrate 120 in Z-direction and the third substrate 160 is disposed over the second substrate in Z-direction. The Z-direction may represent the height dimension of the device 100.

The second substrate 140 is spaced apart in Z-direction from the first substrate 120 and a space between the first substrate 120 and the second substrate 140 is referred to as a first space in the following. Likewise, the third substrate 160 is spaced apart from the second substrate 140 in Z-direction and a space between the second substrate 140 and the third substrate 160 is referred to as a second space in the following. It is to be noted that the first and/or second and/or third substrate need not to be individual parts but may also be (integrally) formed by one piece, e.g. one piece which is provided with trenches to implement the spaces between the substrates.

The first, second and third substrates 120, 140, 160 may be planar and may be oriented parallel to each other. In FIG. 1A parallelism of the first, second and third substrates 120, 140, 160 is exemplarily depicted in the X-direction and may, e.g., also apply to the Y-direction. The X-direction and the Y-direction are perpendicular to each other and define a plane in the length and width direction of the device 100, which is normal to the Z-direction.

The first, second and third substrates 120, 140, 160 may, e.g., individually or all comprise or be a semiconductor substrate, e.g. Si, SiC or GaN substrate. Other substrate materials such as, e.g., an insulator (e.g. glass, quartz, sapphire, etc.), a polymer (Printed circuit Board (PCB)), or a ceramic may also be possible. The distance between the first substrate 120 and the second substrate 140 and the distance between the second substrate 140 and the third substrate 160 may be equal or different and may each reside in a range between, e.g., 100 μm to 400 μm, in particular 200 μm to 300 μm. The first substrate 120, the second substrate 140 and the third substrate 160 may, e.g., have each a thickness in a range between, e.g., 200 μm to 1000 μm, 300 μm to 750 μm, in particular 400 μm to 500 μm.

As will be described further below in more detail, the first space (defined by the first substrate 120 and the second substrate 140) includes one or a plurality of first level ion traps configured to trap ions in the first space. Likewise, the second space (defined by the second substrate 140 and the third substrate 160) includes one or a plurality of second level ion traps configured to trap ions in the second space. That is, the device 100 is a three-dimensional (3D) device for controlling trapped ions. Ions can be controlled in at least one lateral direction in the first space and ion can be controlled in at least one lateral direction in the second space. More specifically, ions can be controlled in the first space at a first level in X-direction and/or Y-direction and ions can be controlled in the second space at a second level in X-direction and/or Y-direction. A movement of ions within the first space and/or within the second space is also termed as "lateral shuttling" of ions. If ions are trapped in the first space and/or in the second space, these ions are not moved in the Z-direction or vertical direction.

Further, the second substrate 140 includes an opening 145 through which ions can be transferred between a first level ion trap which traps ion in the first space and a second level ion trap which traps ion in the second space. The opening 145 allows to transfer ions maintained in the first space to the second space and/or allows ions maintained in the second space to be transferred into the first space. The meaning of the term opening as use herein is to be understood in a broad sense and includes any free space which allows such ion transfer, e.g. a hole in the second substrate, a recess or cutout at an edge of the second substrate or simply a free space between an edge of the second substrate and a wall element of the device 100. In the example above, the ions are transferred from the first space to the second space along the Z-direction. This transfer of ions is also referred herein as "vertical shuttling" of ions.

Still referring to FIG. 1A, a number of ions 180_1 is trapped by one or more first level ion traps (not shown) configured to trap ions 180_1 in the first space. FIG. 1A further illustrates a number of ions 180_2 trapped by one or more second level ion traps (not shown) configured to trap ions 180_2 in the second space. The arrow A1 illustrates the possible transfer or exchange of first level ions 180_1 into the second space and/or of second level ions 180_2 into the first space.

It is to be noted that the device 100 may include more than three substrates and hence more than two spaces between opposing substrates. Such more substrates are disposed relative to each other in the same manner as described above for the three substrates 120, 140, 160. For instance, the device 100 may include a fourth substrate (not shown) disposed over the third substrate 160 in Z-direction to define a third space between the third substrate 160 and the fourth substrate. In this case, the third substrate 160 may be provided with an opening (not shown) similar to the opening 145 of the second substrate 140 to allow transfer of ions between the second space and the third space. The opening (not shown) in the third substrate 160 may be aligned with the opening 145 in the second substrate 140 or may be located at another position in the X-Y-plane. When referring to the exemplary device 100, all disclosure (features, dimensions, functionalities, etc.) may analogously apply to a device 100 having equal to or more than 4, 5, 6, 7, . . . substrates.

Further, it is to be noted that the device 100 for controlling trapped ions may optionally be implemented without substrates. Such device includes—similar to the device 100 which is described above—a first level ion trap which is configured to trap ions at a first level and a second level ion trap which is configured to trap ions in a second level, wherein the first and second levels are spaced apart in a vertical direction (i.e. Z-direction). The device further includes means for transferring the ions between the first level ion trap and the second level ion trap. Examples for such means will be explained in greater detail further below. Differently put, all devices disclosed herein combine lateral shuttling of ions at two different levels with vertical shuttling of ions between these two different levels. It is to be noted that features, functionalities etc. which are described by way of example for a device 100 containing substrates may equally apply to a device without substrates.

The device 100 for controlling trapped ions may implement a number of different functionalities in terms of ion generation, handling and control.

In a loading zone the ions are trapped and cooled in one or a plurality of ion traps. Typically, ions are generated by thermal- or laser-based evaporation of bulk material to generate neutral atoms. Laser-based ionization of the neutral atoms allows for trapping in an ion trap (which will be described in more detail further below). The ions are then cooled by employing laser cooling and stored in the loading zone for later use. Since the evaporation and the ionization usually require high-energy laser light, the loading zone is prone to the generation of surface charges. Therefore, an effective separation between the loading zone and other zones (see below) in a device for controlling trapped ions is beneficial.

Trapped and cooled ions from the loading zone can be transferred to a processing zone. In the processing zone, quantum operations between trapped ions may be carried out. Further, if the ions are trapped as qubits, the qubit states may optionally be read out. Typically, a processing zone requires the access of laser light for laser-based state preparation of trapped ions and laser light for reading out the qubit states. Fluorescence light from ions may need to be collected for state measurement. Further, ions trapped in a processing zone need to be protected from scattered light and interfering electrical fields. Therefore, a high degree of optical accessibility and a high degree of interference screening (optical, magnetic, electrical screening) is desirable for a processing zone.

FIG. 1A schematically illustrates laser light 190 (e.g. from a state preparation laser, a read-out laser, a cooling laser, etc.) directed to second level ions 180_2 and scattered photons (arrows A2) scattered by the second level ions 180_2. As apparent from FIG. 1A, neither the laser light 190 nor the scattered photons (arrows A2) can reach the ions 180_1 trapped in the first space.

One or more storage zones may be implemented in a device 100 for controlling trapped ions. Storage zones are used to stockpile ions in a cooled state so that they can be held available for later use in, e.g., the processing zone. For instance, ions from the processing zone may be transferred to the storage zone and then returned into the processing zone between quantum computing operations. Ions in the storage zone may be more densely packed since no quantum computing is carried out in the storage zone (it is to be noted that multi-qubit operations use the inter-ion Coulomb interaction to entangle the internal and motional states of trapped ions for gate operations such as, e.g., CNOT (controlled-NOT)).

Hence, the more ions are used (e.g. as qubits) the more important is the availability of ions in a cooled state and therefor the implementation of one or more storage zones in the device 100.

Optionally, a separate readout zone may be provided in the device 100. In this case, ions from the processing zone are transferred to the readout zone after being processing. A readout zone should have a high degree of optical accessibility and may also have a high degree of interference screening (optical, magnetic, electrical screening). As mentioned before, the readout functionality may alternatively be implemented in the processing zone.

By way of example, the processing zone may be arranged in the second space above the second substrate 140 while the loading zone may be arranged in the first space between the first substrate 120 and the second substrate 140. This efficiently separates the loading and the processing zone.

More specifically, scattered photons (arrows A2) from the processing zone and/or laser light 190 (e.g. state preparation laser, read-out laser, cooling laser, etc.) will not reach the ions 180_1 trapped in the first space. Likewise, ions 180_2 trapped in the second space and, e.g., used for quantum operations in the processing zone will not be impacted by high-energy (e.g. UV) laser light from the loading zone and/or from interfering surface charges generated in the loading zone.

A storage zone may be arranged in the first space between the first substrate 120 and the second substrate 140 and/or in the second space above the second substrate 140. Further, it is also possible that the first space does not include the loading zone but is a "storage level", i.e. includes one or more storage zones. The second space which may implement the processing zone is then fed by ions from the "storage level" as needed. In this case, the loading zone may, e.g., be implemented in a separate "loading level" beneath the "storage level" or above the "processing level". In one example the "storage level" may be an exclusive "storage level" without containing a loading zone and without containing a processing zone.

Generally, the concept of providing at least two separate ion control levels in Z-direction provides for 3D ion controlling devices (e.g. configured as quantum computing devices) which advantageously make use of the third dimension (in Z-direction) in order to enhance functionality and ion control. In particular, the 3D concept allows increasing the number of ions when compared to 2D devices of the same area. Moreover, optical crosstalk can efficiently be suppressed by the 3D concept, namely by the provision of the second substrate 140 with opening 145. Consequently, the area requirement and the crosstalk limitation for quantum computing are alleviated by the higher packing density made available by exploiting the third dimension (in Z-direction).

In other words, in a 3D ion controlling device 100 as disclosed herein, different levels which are separated by one or more substrates with an opening (here second substrate 140 with opening 145) are employed to mitigate the effects of crosstalk and to relax the size constraint when increasing the number of ions.

Figure 1B:
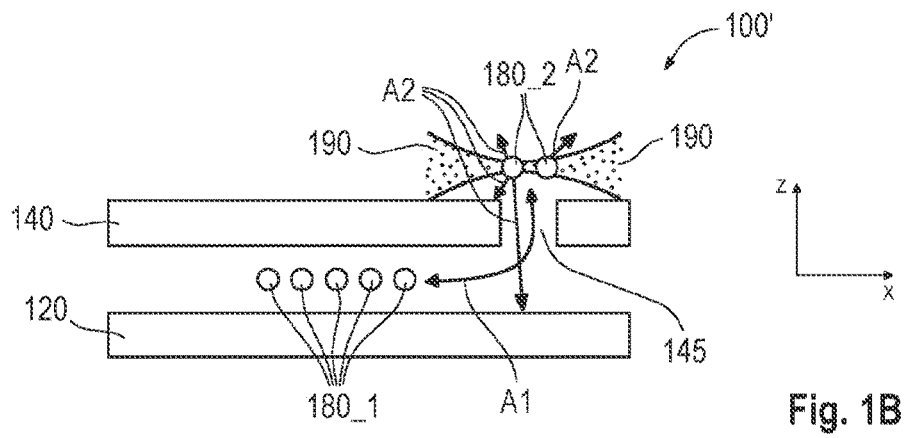
FIG. 1B is a schematic cross-sectional view of an exemplary device for controlling trapped ions comprising two or more substrates placed one above the other.

FIG. 1B illustrates a device 100' for controlling trapped ions which is a variant of the device 100 of FIG. 1A. The device 100' may distinguish from the device 100 of FIG. 1A only in that the third substrate 160 is not used. In this case, the ions 180_2 trapped in the second space are trapped in one or more so-called surface-electrode ion traps. A surface-electrode ion trap contains all the electrodes used for trapping the ions in a single plane, e.g. here in a plane defined by the upper surface of the second substrate 140.

The device 100' may have the advantage of enhanced optical access to the ions 1802 trapped in the second space, e.g. the ions held in the processing zone. Except this difference, the device 100' may be identical to the device 100 and reference is made to the description above in order to avoid reiteration.

Figure 2:
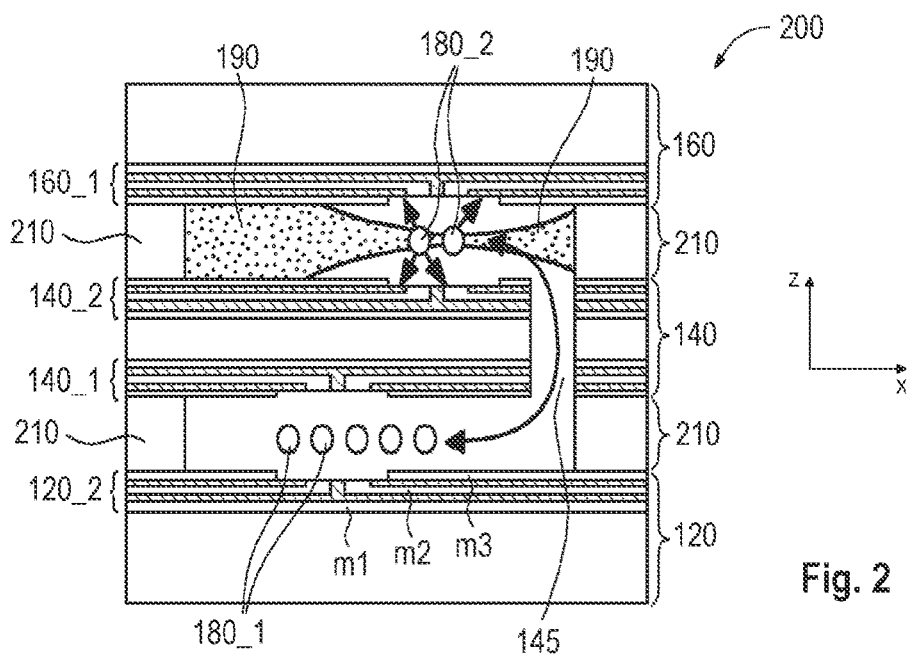
FIG. 2 is a schematic cross-sectional view of an exemplary device for controlling trapped ions, wherein the substrates are provided with multi-layer electrode structures.

Referring to the exemplary device 200 for controlling trapped ions of FIG. 2, the first, second and (optional) third substrates 120, 140, 160 are micro-structured semiconductor substrates, e.g. micro-structured silicon chips or wafers. The device 200 may be designed in accordance with the devices 100 or 100', and reference is made to the above description in order to avoid reiteration.

The first substrate 120 is provided with an upper multi-layer electrode structure 120_2 implemented at a top side of the first substrate 120. The second substrate 140 is provided with a lower multi-layer electrode structure 140_1 implemented at a bottom side of the second substrate 140 and with an upper multi-layer electrode structure 140_2 implemented at a top side of the second substrate 140. Further, the third substrate 160, if present, may be provided with a lower multi-layer electrode structure 160_1 implemented at a bottom side of the third substrate 160. Each substrate, in particular the second substrate 140, may be a multilayer substrate (i.e. a substrate which is formed by at least two substrate layers which are connected (e.g. bonded, glued) together, wherein each substrate layer is provided with a metallization (e.g. a lower substrate layer of the second substrate 140 is provided with the lower multi-layer electrode structure 140_1 and an upper substrate layer is provide with the upper multi-layer electrode structure 140_2).

The multi-layer electrode structures 1202, 140_1, 140_2, 160_1 are configured to form ion traps. More specifically, one or a plurality of first level ion traps comprises the upper multi-layer electrode structure 120_2 of the first substrate 120 and the lower multi-layer electrode structure 140_1 of the second substrate 140. Further, one or a plurality of second level ion traps comprises the upper multi-layer electrode structure 140_2 of the second substrate 140 and, if present, the lower multi-layer electrode structure 160_1 of the third substrate 160. As mentioned before, the third substrate 160 is optional but, if present, increases the potential depth of a second level ion trap compared to a surface-electrode second level ion trap which does not use the third substrate 160.

The one or more ion traps implemented in the first level (i.e. the first space between the first and second substrate 120, 140) and the one or more ion traps implemented in the second level (i.e. in the second space above the second substrate 140) may have different functionalities and/or different designs. The ion traps may have an RF Paul trap design. Paul traps may have an electrode layout that leads to RF trapping in all three dimensions (known as point traps) or may have an electrode layout which causes two-dimensional RF trapping plus static electric-field trapping in the third dimension (known as linear ion traps). In a point ion trap there is only one point, termed RF null, where the RF field is zero, while a linear ion trap has, in general, a zero RF field existing along a line, which is termed RF null line.

The multi-layer electrode structures 1202, 140_1, 140_2, 1601 may each comprise three metal layers. The lowest metal layer, so-called metal 1 (m1), may be configured to screen the respective substrate 120, 140, 160 optically and electrically. Metal 1 may be a continuous metal layer without openings (except at the opening 145). Metal 2 (m2), the metal layer above metal 1, may be a redistribution layer, i.e. may be a structured metal layer which is used for wiring. Metal 2 may be electrically insulated from metal 1 by an insulating layer arranged between metal 1 and metal 2. Metal 3 (m3), the top metal layer, may define the electrode arrangement for the one or plurality of ion traps. Hence, metal 3 is typically a structured metal layer comprising RF electrodes and, optionally, DC electrodes. Metal 3 is electrically connected to metal 2 by vias (not shown) which connect through an electrically insulating layer arranged between metal 2 and metal 3.

The metal layers m1, m2, m3 may be manufactured during front-end-of-line (FEOL) semiconductor processing. The insulating layers between the metal layers m1, m2, m3 may, e.g., comprise or be of silicon nitride and/or silicon oxide.

The first, second and third substrates 120, 140, 160 may be spaced apart by spacer elements 210. The spacer elements 210 may define the distance between the first, second and third substrates 120, 140, 160. The spacer elements may, e.g., be provided with one or more optical ports to allow laser light to be introduced and/or focused in one or more of the spaces between adjacent substrates 120, 140, 160.

Various different approaches may be used to transfer ions from one level to the other level through the opening 145. A first exemplary transfer device is an RF rail electrode arrangement extending through the opening 145 as illustrated in the views of FIGS. 3A-3C.

Figure 3A:
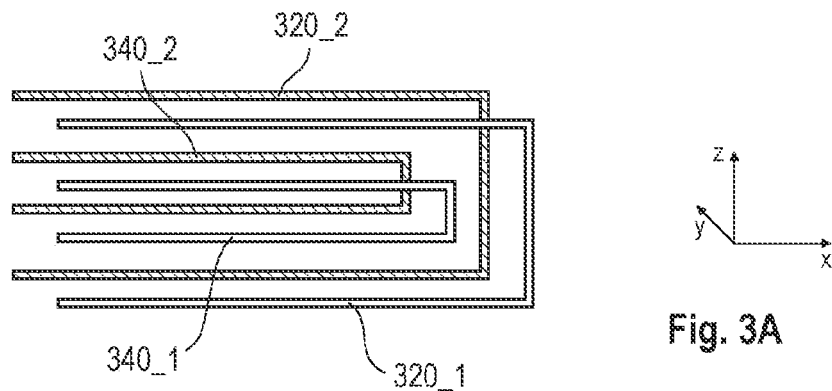
FIG. 3A is a schematic perspective view of an exemplary RF rail electrode arrangement (without substrate and DC electrodes) to transfer ions through an opening in a substrate.
Figure 3B:
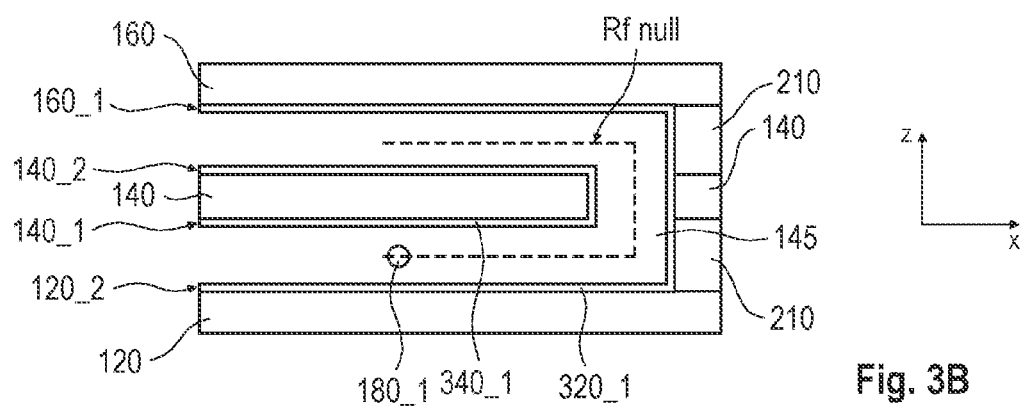
FIG. 3B is a schematic cross-sectional view in the X-Z plane of the exemplary RF rail electrode arrangement of FIG. 3A (with substrate, DC electrodes not visible).
Figure 3C:
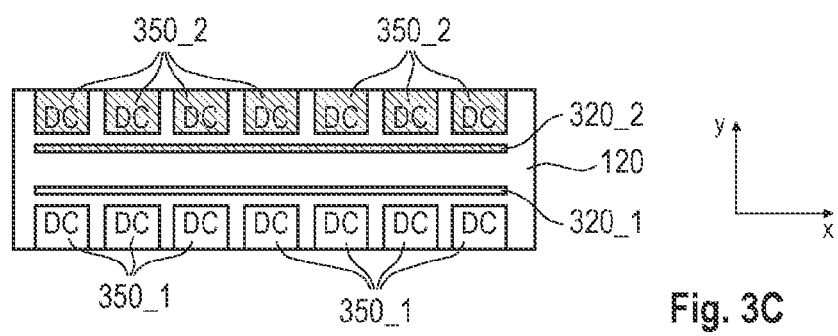
FIG. 3C is a schematic cross-sectional view in the Y-Z plane of the exemplary RF rail electrode arrangement of FIGS. 3A and 3B (with substrate and DC electrodes).

Referring to FIG. 3A, the continuous RF rail electrodes 3201, 3202 may be of the same shape and are spaced apart in the Y-direction. They may follow a U-turn beginning in the upper multi-layer electrode structure 120_2 implemented at the top side of the first substrate 120, continuing through the opening 145 and ending in the lower multi-layer electrode structure 160_1 of the third substrate 160.

The continuous RF rail electrodes 340_1, 340_2 may also be of the same shape and are spaced apart in the Y-direction. They may follow a U-turn beginning in the lower multi-layer electrode structure 1401 implemented at the bottom side of the second substrate 140, continuing through the opening 145 and ending in the upper multi-layer electrode structure 140_2 of the second substrate 140.

The dashed line represents RF null. Hence, the RF rail electrode arrangement shown in FIGS. 3A-3C may, e.g., be a continuous ion trap composed of three linear ion traps which are directly connected to each other and which extend horizontally in the first level, vertically through the opening 145 between the first level and the second level and horizontally in the second level.

FIG. 3C illustrates a sectional view along the top side of the first substrate 120. In addition to the RF rail electrodes 320_1, 320_2, DC electrodes 350_1 and 350_2 are arranged adjacent to the RF rail electrodes 320_1 and 3202, respectively. The DC electrodes 350_1 and the DC electrodes 350_2 may be arranged along corresponding RF rail electrodes 320_1, 3202 in a row and may in operation be of opposite polarity.

An RF electrode and DC electrode structure as illustrated in FIG. 3C may also be formed in the lower and upper multi-layer electrode structures 140_1 and 140_2 of the second substrate 140 and in the lower multi-layer electrode structure 160_1 of the third substrate 160. As mentioned previously, the RF rail electrodes 320_1, 320_2, 340_1, 340_2 and the DC electrodes 350_1, 350_2 may be structured in metal 3 (see FIG. 2).

It is to be noted that the DC electrodes 350_1, 350_2 and the RF rail electrodes 320_1, 320_2 are formed in the vertical direction on the spacer elements 210. While the RF rail electrodes 320_1 and 320_2 define the RF null position in Y-direction, the DC electrodes 350_1, 350_2 define the actual minimum of the potential in X-direction.

Figure 4:
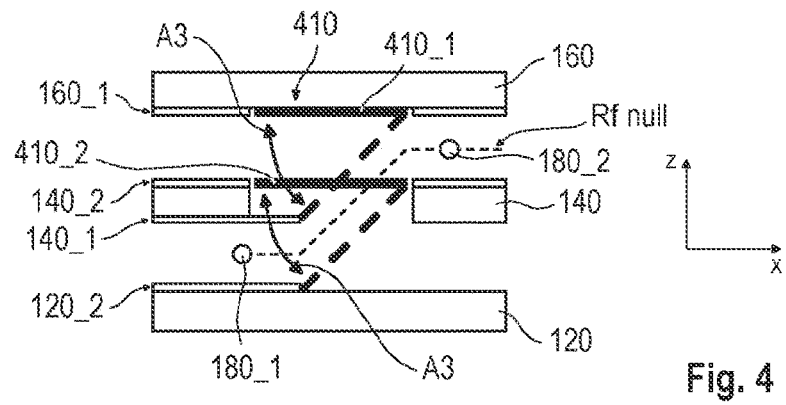
FIG. 4 is a schematic cross-sectional view in the X-Z plane of a movable micro-electro-mechanical system (MEMS) element to transfer ions through an opening in a substrate.

Referring to FIG. 4, the shuttling of ions between an ion trap in the first level and an ion trap in the second level may also be accomplished by a movable micro-electro-mechanical system (MEMS) element 410. The MEMS element 410 may be a movable element which can be switched between a first position in which the first level and the second level remain separated from each other, i.e. in which the opening 145 is closed for ion transfer, and a second position in which ions 180_1 are guided from the first level through the opening 145 to the second level.

For instance, the MEMS element 410 may comprise a first movable RF electrode 410_1 and a second movable RF electrode 410_2. The movable RF electrodes 410_1, 410_2 may be moved along the arrow A3 to switch between the two MEMS element positions. When the movable RF electrodes 410_1, 410_2 are in the lower position, ion transfer along the diagonal RF null line from the first level to the second level is possible. When the first and second RF electrodes 410_1, 410_2 are in the upper position, the RF electrodes 410_1 and 410_2 may form part of an ion trap located in the second level, thereby closing the entrance for ions to be transferred between the first level and the second level.

By way of example, the RF electrodes 410_1, 410_2 may be formed by metal tongues or springs (e.g. of a few μm thickness) which may be elastically deflected by means of an actuator (not shown). The actuator may, e.g., be a capacitive or electrostatic actuator.

According to an example, the MEMS element 410 may repeatedly be switched from one position to the other position and vice versa. However, it is also possible that the MEMS element 410 can only be switched one single time from one position (e.g. opened start position) to the other position (e.g. closed permanent end position). In another example, the MEMS element 410 may be implemented in the first substrate 120 in the first position. After disposing the first substrate 120 on the second substrate 140, the MEMS element 410 is moved to the second position to extend towards the second substrate 140 to from a rail or passage for ions.

Figure 5A:
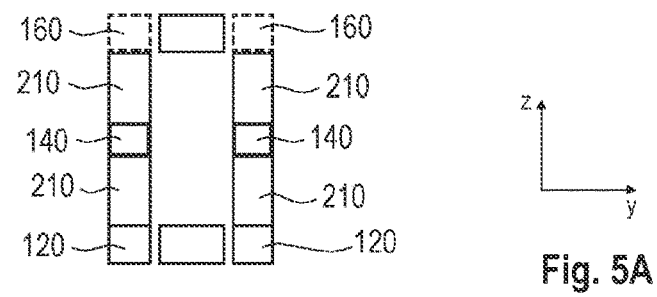
FIG. 5A is a schematic cross-sectional view in the Y-Z plane of an exemplary point ion trap to transfer ions through an opening in a substrate.
Figure 5B:
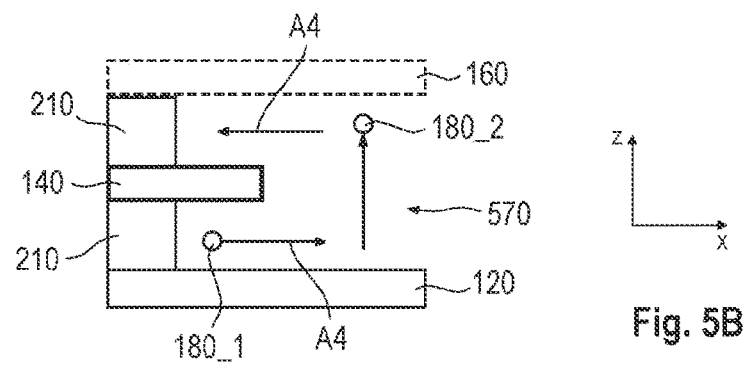
FIG. 5B is a schematic cross-sectional view in the X-Z plane of the exemplary point ion trap of FIG. 5A.
Figure 5C:
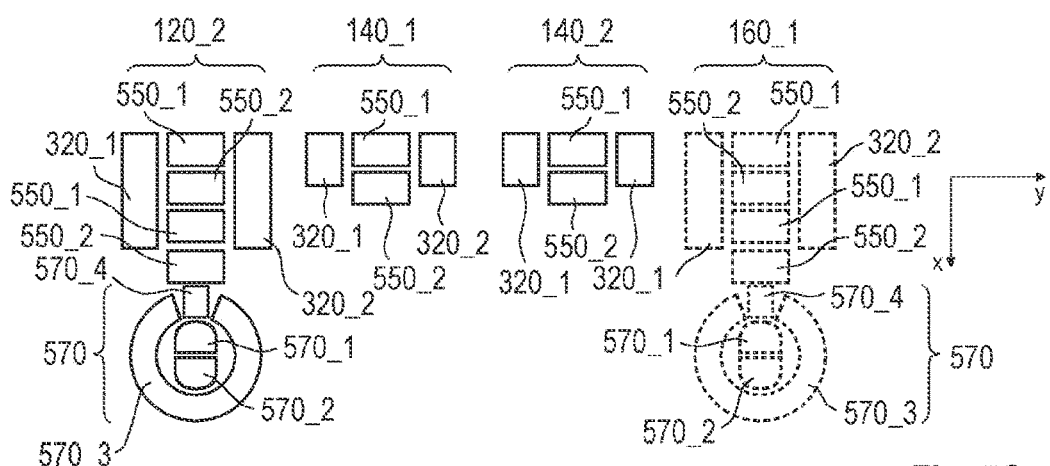
FIG. 5C are schematic cross-sectional views in the X-Y planes of the upper substrate and the lower substrate of the exemplary point ion trap of FIGS. 5A-5B.

Referring to FIGS. 5A-5C, another approach for transferring ions between different levels of a 3D device 100, 100', 200 for ion controlling (and, e.g., quantum computing) is based on the implementation of a point ion trap configured to transfer ions between a first level ion trap and a second level ion trap. The point ion trap approach does neither require a movable mechanical element nor an RF rail electrodes passing through the opening 145. Rather, an ion 180_1 held in a first level ion trap (e.g. a linear ion trap) may be handed over from the first level ion trap to a point ion trap, the ion is then lifted by the point ion trap to the second level and then handed over from the point ion trap as ion 180_2 to a second level ion trap (e.g. a linear ion trap).

More specifically, the left part of FIG. 5C illustrates an electrode arrangement formed by the upper multi-layer electrode structure 120_2 of the first substrate 120 and the right part of FIG. 5C illustrates a corresponding electrode arrangement formed by the lower multi-layer electrode structure 160_1 of the third substrate 160. The linear ion traps may be formed by DC electrodes 550_1, 550_2 of opposite polarity and RF rail electrodes 320_1, 320_2. The point ion trap 570 which provides for the vertical ion movement may comprise DC electrodes 570_1, 570_2 of opposite polarity, a ring segment RF electrode 570_3 and a DC entrance electrode 570_4. Further, the middle left part of FIG. 5C illustrates an electrode arrangement of the linear ion trap formed by the lower multi-layer electrode structure 140_1 of the second substrate 140, and the middle right part of FIG. 5C illustrates an electrode arrangement of the linear ion trap formed by the upper multi-layer electrode structure 140_2 of the second substrate 140. These electrode arrangements of the linear ion traps may be formed by DC electrodes 550_1, 550_2 of opposite polarity and RF rail electrodes 320_1, 320_2 arranged opposite the respective RF rail electrodes 3201, 320_2 in the upper multi-layer electrode structure 120_2 of the first substrate 120 and the lower multi-layer electrode structure 160_2 of the third substrate 160, respectively.

The point ion trap 570 allows a strictly vertical movement of the ions 180_1, 180_2. That is, the point ion trap 570 at the first substrate 120 (left part of FIG. 5C) serves as a lift which passes the ion 180_1 along arrow A4 (see FIG. 5B) to the point ion trap 570 formed at the third substrate 160 (see right part of FIG. 5C). The point ion trap 570 at the third substrate 160 may seamlessly overtake the ion 180_1 into the second level and may then pass the ion as a second level ion 180_2 in a lateral direction (see arrow A4) out of the point ion trap 570 into another second level ion trap, e.g. a linear ion trap.

If the point ion trap approach is used to transfer ions between the first level and the second level, it is possible to receive ions from and/or distribute ions in different lateral directions. That is, the point ion trap 570 may simultaneously change the lateral direction of ion transfer and the level in which the ion is maintained. Hence, the point ion trap approach adds another degree of freedom to inter-level ion shuttling as accomplished by the "ion rail" approach of FIGS. 3A-3C or the "ion ramp" approach of FIG. 4. For instance, while the linear ion trap in the left side of FIG. 5C is oriented in the X-direction, the linear ion trap in the right side of FIG. 5C may, e.g., be oriented in the Y-direction (rather than also in the X-direction as depicted). Differently put, the arrows A4 in FIG. 5B may indicate "horizontal shuttling" in any lateral direction rather than in the X-direction as shown by way of example.

All devices 100, 100', 200 as disclosed herein may be micro-fabricated semiconductor devices using an assembly of semiconductor substrates 120, 140, 160 and multi-layer electrode structures implemented by semiconductor metallization processing technologies.

Figure 6:
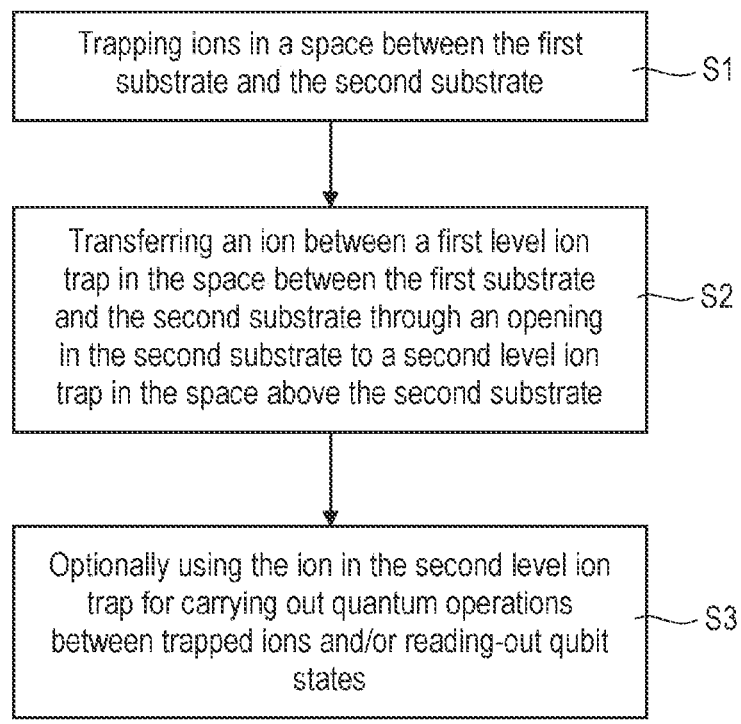
FIG. 6 is a flowchart depicting stages of a method of controlling tapped ions in a device in accordance with the present disclosure.

FIG. 6 illustrates a method of controlling trapped ions in a device as, e.g., disclosed above and may comprise the steps of trapping ions in a space between the first substrate and the second substrate at S1.

At S2 ions are transferred between a first level ion trap in the space between the first substrate and the second substrate through an opening in the second substrate to a second level ion trap in the space above the second substrate.

At S3 the ion in the second level ion trap may optionally be used for, e.g., carrying out quantum operations between trapped ions and/or reading-out qubit states.

Further options are stockpiling and/or cooling ions in either the first or second level as mentioned before. That is, in each level the ions may be passed in different lateral directions to different destinations for the sake of different functionalities (e.g. ion generation, ion state preparation, ion operation, qubit state readout, ion stockpiling (storage), etc.).

The following examples pertain to further aspects of the disclosure:

Example 1 is a device for controlling trapped ions. The device includes a first substrate. A second substrate is disposed over the first substrate. One or a plurality of first level ion traps is configured to trap ions in a space between the first substrate and the second substrate. One or a plurality of second level ion traps is configured to trap ions in a space above the second substrate. An opening in the second substrate is provided through which ions can be transferred between a first level ion trap and a second level ion trap.

In Example 2, the subject matter of Example 1 can optionally include a third substrate disposed over the second substrate, wherein the space above the second substrate is confined by the third substrate.

In Example 3, the subject matter of Example 1 or 2 can optionally include wherein the first substrate and/or the second substrate is a semiconductor substrate.

In Example 4, the subject matter of any preceding Example can optionally include wherein the first substrate is provided with an upper multi-layer electrode structure implemented at a top side of the first substrate; and the second substrate is provided with a lower multi-layer electrode structure implemented at a bottom side of the second substrate and with an upper multi-layer electrode structure implemented at a top side of the second substrate; wherein the one or plurality of first level ion traps comprises the upper multi-layer electrode structure of the first substrate and the lower multi-layer electrode structure of the second substrate, and the one or plurality of second level ion traps comprises the upper multi-layer electrode structure of the second substrate.

In Example 5, the subject matter of any preceding Example can optionally include a loading zone arranged in the space between the first substrate and the second substrate, in which the ions are generated, cooled and trapped in the one or plurality of first level ion traps; and a processing zone arranged in the space above the second substrate, in which the ions are trapped in the one or plurality of second level ion traps and in which quantum operations between trapped ions are carried out. Optionally, qubit states are read out in the processing zone.

In Example 6, the subject matter of Example 5 can optionally include a storage zone in which ions are stockpiled in a cooled state, the storage zone being arranged in the space between the first substrate and the second substrate or in the space above the second substrate.

In Example 7, the subject matter of any preceding Example can optionally include wherein the one or plurality of first level ion traps comprises a linear ion trap and the one or plurality of second level ion traps comprises a linear ion trap.

In Example 8, the subject matter of any preceding Example can optionally include a movable micro-electromechanical system, MEMS, element configured to transfer ions between the first level ion trap and the second level ion trap.

In Example 9, the subject matter of any preceding Example can optionally include a point ion trap configured to transfer ions between the first level ion trap and the second level ion trap.

In Example 10, the subject matter of any preceding Example can optionally include an RF rail electrode arrangement extending through the opening and configured to transfer ions between the first level ion trap and the second level ion trap.

In Example 11, the subject matter of any preceding Example can optionally include at least one of a second level linear ion trap oriented in a lateral X-direction and a second level linear ion trap oriented in a lateral Y-direction, the X-direction being perpendicular to the Y-direction; wherein the ions can be transferred through the opening in a direction having a component in a Z-direction, the Z-direction being perpendicular to a plane define by the X-direction and the Y-direction.

Example 12 is a method of controlling trapped ions in a device, the device including a first substrate; a second substrate disposed over the first substrate; one or a plurality of first level ion traps configured to trap ions in a space between the first substrate and the second substrate; one or a plurality of second level ion traps configured to trap ions in a space above the second substrate; and an opening in the second substrate, wherein the method comprising: transferring ions between a first level ion trap and a second level ion trap through the opening.

In Example 13, the subject matter of Example 12 can optionally include generating, cooling and trapping ions in the space between the first substrate and the second substrate.

In Example 14, the subject matter of Example 12 or 13 can optionally include carrying out quantum operations between trapped ions and reading-out qubit states in the space above the second substrate.

In Example 15, the subject matter of any of Examples 12 to 14 can optionally include stockpiling and cooling ions in the space between the first substrate and the second substrate and/or in the space above the second substrate.

In Example 16, the subject matter of any of Examples 12 to 15 can optionally include transferring ions between the first level ion trap and the second level ion trap through the opening by setting a movable MEMS element in a transfer position, or lifting or lowering the ions through the opening by means of a point ion trap, or guiding the ions along an RF rail electrode arrangement extending through the opening.

Example 17 is a device for controlling trapped ions. The device includes a first level ion trap which is configured to trap ions at a first level and a second level ion trap which is configured to trap ions in a second level, the first and second levels are spaced apart in a vertical direction. The device further includes means for transferring the ions between the first level ion trap and the second level ion trap.

Example 18 is a method of controlling trapped ions in a device, the device includes a first level ion trap which is configured to trap ions at a first level and a second level ion trap which is configured to trap ions in a second level, the first and second levels are spaced apart in a vertical direction. The method further comprises transferring ions between the first level ion trap and the second level ion trap.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device for trapping ions, the device comprising:
   a first substrate provided with an upper multi-layer electrode structure implemented at a top side of the first substrate;
   a second substrate disposed over the first substrate, the second substrate provided with a lower multi-layer electrode structure implemented at a bottom side of the second substrate; and
   one or more first level ion traps configured to trap ions in a space between the first substrate and the second substrate, the one or more first level ion traps comprising the upper multi-layer electrode structure of the first substrate and the lower multi-layer electrode structure of the second substrate.

2. The device of claim 1, wherein the one or more first level ion traps is configured to control the ions in at least one lateral direction in the space between the first substrate and the second substrate.

3. The device of claim 1, further comprising:
   a processing zone arranged in the space between the first substrate and the second substrate, in which the ions are trapped and in which quantum operations between trapped ions are carried out.

4. The device of claim 3, wherein the processing zone is configured to receive laser light for laser-based state preparation of the trapped ions.

5. The device of claim 3, wherein the one or more first level ion traps is configured to trap the ions as qubits, and wherein the processing zone is configured to receive laser light for reading out states of the qubits.

6. The device of claim 3, wherein the processing zone is configured to protect the trapped ions from scattered light and interfering electrical fields.

7. The device of claim 3, further comprising:
   a readout zone configured to receive processed ions from the processing zone.

8. The device of claim 7, wherein the readout zone is optically accessible.

9. The device of claim 1, further comprising:
a storage zone arranged in the space between the first substrate and the second substrate, in which ions are stockpiled in a cooled state.

10. The device of claim 1, wherein the one or more first level ion traps has an RF Paul trap design.

11. The device of claim 1, further comprising:
one or more second level ion traps configured to trap ions in a space above the second substrate.

12. The device of claim 11, wherein the one or more second level ion traps is further configured to carry out quantum operations between trapped ions in the space above the second substrate.

13. The device of claim 12, wherein the one or more second level ion traps is further configured to read-out qubit states in the space above the second substrate.

14. A method of controlling trapped ions in a device having a first substrate provided with an upper multi-layer electrode structure implemented at a top side of the first substrate, and a second substrate disposed over the first substrate and provided with a lower multi-layer electrode structure implemented at a bottom side of the second substrate, the method comprising:
forming one or more first level ion traps in a space between the first substrate and the second substrate, the one or more first level ion traps comprising the upper multi-layer electrode structure of the first substrate and the lower multi-layer electrode structure of the second substrate; and
trapping ions in the space between the first substrate and the second substrate using the one or more first level ion traps.

15. The method of claim 14, further comprising:
generating and cooling ions in the space between the first substrate and the second substrate.

16. The method of claim 14, further comprising:
carrying out quantum operations between trapped ions and reading-out qubit states in a space above the second substrate.

17. The method of claim 14, further comprising:
stockpiling and cooling ions in the space between the first substrate and the second substrate and/or in a space above the second substrate.

18. The method of claim 14, further comprising:
trapping ions in a space above the second substrate using one or more second level ion traps; and
transferring ions between the one or more first level ion traps and the one or more second level ion traps.

19. The method of claim 14, further comprising:
stockpiling ions in a cooled state in a storage zone arranged in the space between the first substrate and the second substrate.

* * * * *